(12) United States Patent
Kakui et al.

(10) Patent No.: US 8,183,509 B2
(45) Date of Patent: May 22, 2012

(54) LASER PROCESSING APPARATUS AND LASER PROCESSING METHOD

(75) Inventors: Motoki Kakui, Yokohama (JP); Kazuo Nakamae, Yokohama (JP); Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/193,038

(22) Filed: Jul. 28, 2011

(65) Prior Publication Data

US 2012/0006979 A1    Jan. 12, 2012

Related U.S. Application Data

(62) Division of application No. 12/256,974, filed on Oct. 23, 2008, now Pat. No. 8,039,778.

(30) Foreign Application Priority Data

Oct. 24, 2007  (JP) ................................ 2007-276773

(51) Int. Cl.
    *G01J 1/32*  (2006.01)

(52) U.S. Cl. ................ 250/205; 250/227.26; 372/29.01; 372/29.011

(58) Field of Classification Search .................. 250/205; 372/6, 29.01, 29.011, 29.014, 30
    See application file for complete search history.

(56) References Cited

U.S. PATENT DOCUMENTS

| 4,539,481 A | 9/1985 | Troukens et al. |
| 7,349,451 B2 * | 3/2008 | Nakayama et al. ............. 372/21 |
| 2009/0310628 A1 | 12/2009 | Yamazaki |

FOREIGN PATENT DOCUMENTS

| JP | 58-105550 | 6/1983 |
| JP | 02-117788 | 5/1990 |
| JP | 06-55281 | 3/1994 |
| JP | 08-001366 | 1/1996 |
| JP | 08-182142 | 7/1996 |
| JP | 08-186918 | 7/1996 |
| JP | 2004-074253 | 3/2004 |
| JP | 2006-292424 | 10/2006 |

* cited by examiner

*Primary Examiner* — Kevin Pyo
(74) *Attorney, Agent, or Firm* — Venable LLP; Michael A. Sartori

(57) ABSTRACT

The present invention relates to a laser processing apparatus and the like having a structure for implementing at the same time both an efficient laser processing in the place where a laser beam is difficult to reach and a laser processing without damages in the place where the laser beam is easy to reach. This laser processing apparatus comprises a laser light source, an irradiation optical system applying a laser beam to an object while scanning the laser beam, a photo-detector detecting the laser beam applied from the irradiation optical system, and a control section of making switching between a continuous oscillation and a pulse oscillation of the laser beam at the laser light source. In particular, the control section makes a continuous oscillation of the laser beam with respect to the laser light source in the case in which the laser beam applied from the irradiation optical system is detected at the photo-detector; while it makes a pulse oscillation of the laser beam with respect to the laser light source in the case in which no laser beam applied from the irradiation optical system is detected at the photo-detector.

10 Claims, 9 Drawing Sheets

LASER PROCESSING APPARATUS AND LASER PROCESSING METHOD

CROSS-REFERENCE TO RELATED APPLICATIONS

This application is a Divisional of U.S. patent application Ser. No. 12/256,974, filed Oct. 23, 2008, which claims the benefit of Japan Patent Application No. 2007-276773, filed Oct. 24, 2007, all of which are incorporated herein by reference in their entirety.

BACKGROUND OF THE INVENTION

1. Field of the Invention

The present invention relates to a laser processing apparatus and a laser processing method.

2. Related Background Art

By applying a laser beam with respect to the surface of an object to be processed, this irradiated portion on the surface of this object can be processed. As such a laser processing technique, for example, methods as described in the following Patent Document 1 and Patent Document 2 are disclosed.
[Patent Document 1] Japanese Patent Application Laid-Open No. 06-055281
[Patent Document 2] Japanese Patent Application Laid-Open No. 08-186918

SUMMARY OF THE INVENTION

The present inventors have examined the above conventional laser processing methods, and as a result, have discovered the following problems.

That is, in the case in which an object to be laser-processed has an irregular shape, it is known that processing in the place where a laser beam is less likely to reach, such as the side face of the object is difficult to be made. As the technique to solve such problem, for example, laser processing methods of Patent Document 1 and Patent Document 2 are disclosed. In specific, in the methods disclosed in these patent Document 1 and patent Document 2, it is necessary for an object and an irradiation optical system of applying the laser beam onto the object to be located with high accuracy. However, it is difficult to actually place the object and the optical system with high accuracy, and processing in the place where a laser beam is less likely to reach cannot be sufficiently made.

The present invention has been developed to eliminate the problems described above. It is an object of the present invention to provide a laser processing apparatus and a laser processing method having such a structure as a laser processing in the place where a laser beam is difficult to reach can be properly made, as well as a laser processing also in the place where the laser beam is easy to reach can be made without the occurrence of damages of the object.

In order to achieve the object of the present invention, a laser processing apparatus according to the present invention, as a first construction example, comprises a laser light source, an irradiation optical system, a photo-detector and a control section. The laser light source emits a laser beam. The irradiation optical system applies the laser beam having been emitted from the laser light source to an object and the surroundings thereof while scanning an irradiation position of this laser beam along a predetermined direction. The photo-detector is provided on the opposite side to the irradiation optical system with respect to the object. Furthermore, the photo-detector detects the laser beam having been emitted from the irradiation optical system. The control section makes switching between a continuous oscillation and a pulse oscillation of the laser beam at the laser light source.

In particular, in the laser processing apparatus according to the present invention, the control section makes a continuous oscillation of the laser beam with respect the laser light source in the case in which the laser beam having been applied from the irradiation optical system is detected at the photo-detector (for the duration of time that it can be detected); and it makes a pulse oscillation of the laser beam with respect to the laser light source in the case in which no laser beam having been applied from the irradiation optical system is detected at the photo-detector (for the duration of time that it cannot be detected).

In such manner, in the laser processing apparatus according to the present invention, between a time period during which a laser beam applied from the irradiation optical system can be detected and a time period during which it cannot be detected, switching between the continuous oscillation of the laser beam and the pulse oscillation thereof is made. That is, at a time point when the laser beam is applied to the object (at the start of the time period during which it cannot be detected), the laser light source starts the pulse oscillation of the laser beam. At the time point of the start of such time period during which the laser beam cannot be detected, the laser beam is applied onto the place close to the side face of the object (where the laser beam is difficult to reach). That is, when switching is made from the continuous oscillation to the pulse oscillation at the time point of irradiation of the place where the laser beam is difficult to reach, since the intensity of the laser beam becomes high when the laser beam starts the pulse oscillation, even in the place where the laser beam is difficult to reach, an efficient irradiation can be made.

In addition, it is preferable that the laser processing apparatus according to the present invention, as another means (a second construction example) of enabling determination of the time period during which the laser beam can be detected and the time period during which it cannot be detected, in addition to the above-described construction, is provided with a monitor light source emitting a monitor light which wavelength is different from that of the laser beam, and an optical filter selectively transmitting the monitor light. In this case, the irradiation optical system, applies the laser beam having been emitted from the laser light source and the monitor light having been emitted from the monitor light source to the object and the surroundings thereof while scanning the irradiation position of these laser beam and monitor light along a predetermined direction. Incidentally, the irradiation position of the laser beam and the irradiation position of the monitor light are preferably coincident for the purpose of improvements in accuracy of laser processing. Further, the photo-detector that is provided on the opposite side to the irradiation optical system with respect to the object detects the monitor light having been transmitted through the optical filter. Incidentally, the control section controls the start and the stop of pulse oscillation with respect to the laser light source. In particular, the control section stops the pulse oscillation of the laser beam with respect to the laser light source in the case in which the monitor light having been applied from the irradiation optical system is detected at the photo-detector (in a time period during which it can be detected); while it makes the pulse oscillation of the laser beam with respect to the laser light source in the case in which no monitor light having been applied from the irradiation optical system is detected at the photo-detector (in a time period during which it cannot be detected).

In such way, also by using lights of two different wavelengths as the laser beam and the monitor light, the above-described effects can be obtained. That is, at a time point when the laser beam and the monitor light are started to be directly applied onto the object (at a time point when the photo-detector cannot detect the monitor light), the laser light source starts the pulse oscillation of the laser beam. Therefore, the intensity of the laser beam comes to be high in timing that the laser beam is applied to the side face and the like of the object where the laser beam is difficult to reach. As a result, it becomes possible to make laser processing efficiently also in the place where the laser beam is difficult to reach.

In the laser processing apparatus according to this invention, a wavelength of the monitor light to be emitted from the monitor light source is preferably shorter than a wavelength of the laser beam to be emitted from the laser light source. In this case, it becomes easy to make a separation between the laser beam and the monitor light, and damages of the photo-detection can be easily prevented.

In addition, a difference between a peak wavelength of a sensitivity at the photo-detector and a wavelength of the monitor light to be emitted from the monitor light source is preferably smaller than a difference between a peak wavelength of the sensitivity and a wavelength of the laser beam to be emitted from the laser light source. By causing the peak wavelength of the sensitivity to be close to the wavelength of the monitor light, since detection accuracy of the photo-detector is increased, it comes to be possible to implement laser processing with higher accuracy.

In the laser processing apparatus according to the present invention, the irradiation position of only the laser beam, or the laser beam and the monitor light is preferably scanned at a speed of less than 1 m/s. In the case of high scanning speed, since in a time period from detection of the laser beam and the monitor light at the photo-detector until the start of pulse oscillation of the laser beam, a movement distance of the laser beam or the monitor light becomes longer, the accuracy of laser processing may be decreased. To make laser processing with higher accuracy, the scanning speed is preferably within the above-mentioned range.

Further, the irradiation optical system includes such a scanning path that the irradiation position of the laser beam gets across this object from outside the object, and thereafter reaches outside this object. In addition, the control section controls the start and the stop of pulse oscillation of the laser beam when the irradiation optical system reciprocates along the scanning path. Due to that the start and the stop of pulse oscillation of the baser beam are controlled while the irradiation position of the laser beam is being reciprocated over the object, since a laser processing efficiency can be improved at larger portions, it is possible to increase effects according to the present invention.

The control section has a function changing a repetition frequency at the time when the laser beam is pulse-oscillated. Furthermore, the control section can set this repetition frequency higher than that at the start of pulse oscillation at least once while the laser beam is being pulse-oscillated from the laser light source. In addition, the control section has a function of changing energy per one pulse at the time when the laser beam is pulse-oscillated. In this case, the control section can set this energy smaller than that at the start of pulse oscillation at least once while the laser beam is being pulse-oscillated from the laser light source. In such manner, owing to the arrangement of changing the intensity of the laser beam even while the laser beam is being pulse-oscillated, the intensities of the laser beam can be adjusted to be different between in the place where the laser beam is easy to reach and in the place where it is difficult to reach in the laser irradiation regions at the object. Further, also in the place where the laser beam is easy to reach, laser processing can be made without the occurrence of damages with respect to the object.

A laser processing method according to the present invention, as a first arrangement example, comprises the step of applying a laser beam having been emitted from a laser light source to an object and the surroundings thereof while scanning an irradiation position of this laser beam along a predetermined direction via an irradiation optical system. The laser beam from the irradiation optical system is detected by the photo-detector that is provided on the opposite side to the irradiation optical system with respect to the object. In this arrangement, in the laser processing method according to the present invention, the laser beam is continuously oscillated with respect the laser light source in the case in which the laser beam from the irradiation optical system is detected by the photo-detector (for the duration of time that it can be detected); while the laser beam is pulse-oscillated with respect to the laser light source in the case in which no laser beam from the irradiation optical system is detected by the photo-detector (for the duration of time that it cannot be detected).

Furthermore, it is preferable that the laser processing method according to the present invention, as a second arrangement example, in addition to the laser beam having been emitted from the laser light source, has the arrangement of applying a monitor light which wavelength is different from that of the laser beam having been emitted from the monitor light source to this object and the surroundings thereof so that their application angles onto the object are the same. At this time, the irradiation optical system, while scanning the irradiation position of the laser beam and the monitor light along a predetermined direction, applies these laser beam and monitor light to the object and the surroundings thereof. Incidentally, the irradiation position of the laser beam and the irradiation position of the monitor light are preferably coincident in order to implement laser processing with higher accuracy.

The photo-detector that is provided on the opposite side to the irradiation optical system with respect to the object detects the monitor light having been emitted from the monitor light source through the optical filter. Incidentally, the optical filter is disposed between the object and the photo-detector, and interrupts the laser beam and in the meantime, transmits the monitor light. In this arrangement, in the laser processing method according to the present invention, the laser beam is stopped to be pulse-oscillated with respect to the laser light source in the case in which the monitor light from the irradiation optical system is detected by the photo-detector (for the duration of time that it can be detected); while the laser beam is pulse-oscillated with respect to the laser light source in the case in which no monitor light from the irradiation optical system is detected by the photo-detector (for the duration of time that it cannot be detected).

In the laser processing method of the above-described second arrangement, a wavelength of the monitor light to be emitted from the monitor light source is preferably shorter than a wavelength of the laser beam to be emitted from the laser light source. Further, a difference between a peak wavelength of a sensitivity at the photo-detector and a wavelength of the monitor light to be emitted from the monitor light source is preferably set smaller than a difference between a peak wavelength of the sensitivity at the photo-detector and a wavelength of the laser beam to be emitted from the laser light source.

In the laser processing method according to the present invention, the irradiation position of the laser beam and the monitor light is preferably scanned at a speed of less than 1 m/s.

In addition, the irradiation optical system preferably makes laser processing while reciprocating an irradiation position of the laser beam so as to get across the object along a first direction, and thereafter to get across the object again along a second direction opposite to the first direction. On this occasion, the irradiation position of the monitor light is scanned as is that of the laser beam.

Furthermore, in the laser processing method according to the present invention, it is preferable that a repetition frequency of pulse oscillation is set higher than that at the start of emission of this laser beam at least once while the laser beam is being applied to the object. In addition, it is preferable that energy per one pulse at the time of pulse oscillation is set smaller than that at the start of emission of this laser beam at least once while the laser beam is being applied to the object.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1:
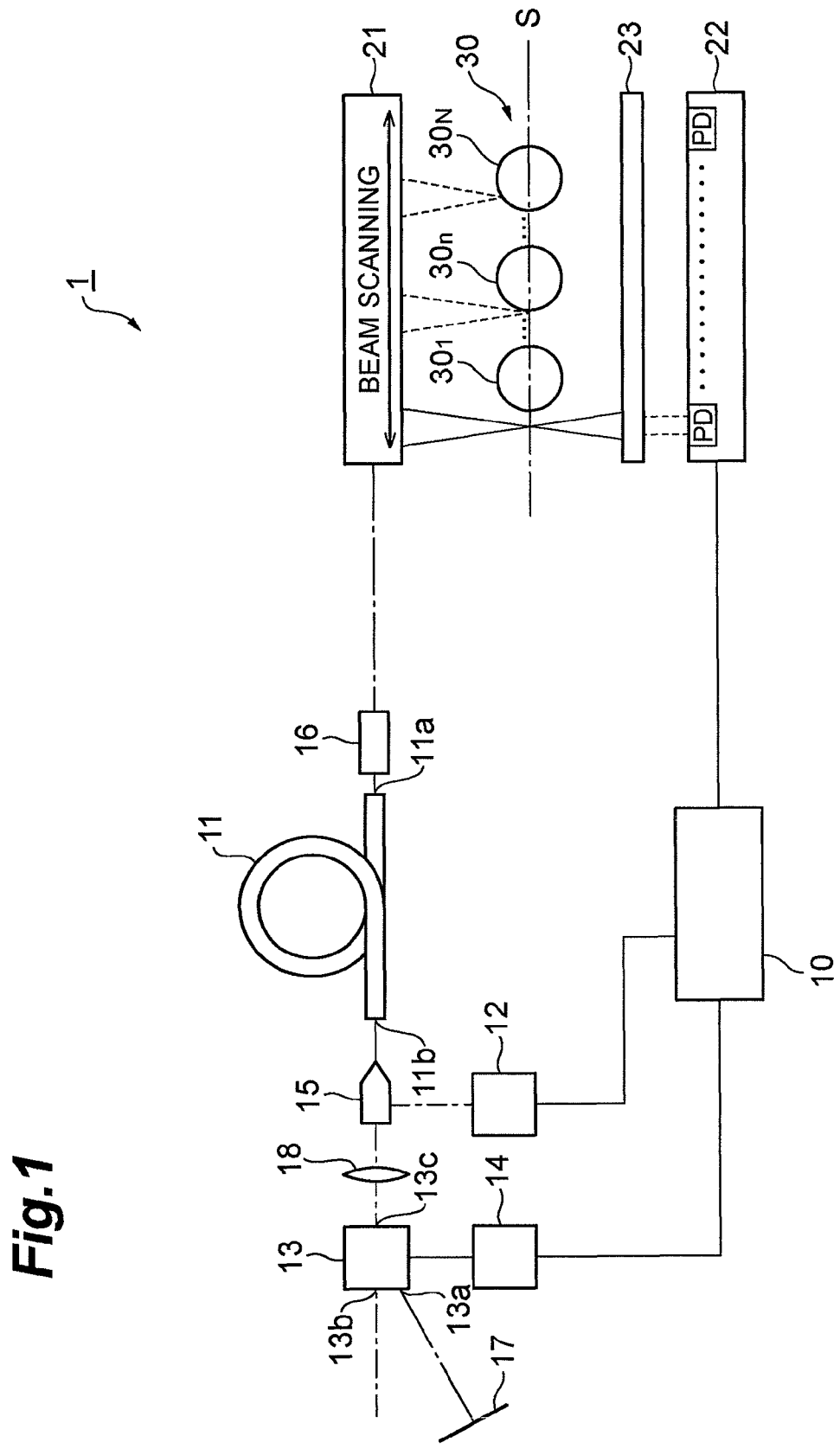
FIG. 1 is a view of showing construction of a first embodiment of a laser processing apparatus according to the present invention.

In the following, embodiments of a laser processing apparatus according to the present invention will be explained in detail while referring to FIGS. 1 to 3, 4A to 5C, 6 to 8 and 9A to 9C. In the description of the drawings, identical or corresponding components are designated by the same reference numerals, and overlapping description is omitted.

A First Embodiment

A first embodiment of a laser processing apparatus according to the present invention will be described. FIG. 1 is a view showing construction of a laser processing apparatus according to the first embodiment. A laser processing apparatus 1 according to the first embodiment shown in FIG. 1 is provided with a control section 10, an optical amplification fiber 11, an excitation light source 12, an optical switch 13, a drive circuit 14, a combiner 15, a collimator 16, a total reflection mirror 17, a lens 18, a light irradiation section 21, a photo-detector section 22 and an optical attenuation filter 23.

The optical amplification fiber 11 is an optical fiber to which optical waveguide region a fluorescent element is added. The optical amplification fiber 11, when supplied with an excitation light of a wavelength that can excite this fluorescent element, emits fluorescence from this fluorescent element. This fluorescent element is preferably a rare-earth element, more preferably Er element, Yb element or the like. One end face 11a of the optical amplification fiber 11 is a vertical cleavage plane, and the other end face 11b of the optical amplification fiber 11 is applied with an antireflection coating.

The excitation light source 12 continuously outputs an excitation light for exciting the fluorescent element having been added to the optical amplification fiber 11. This excitation light source 12 preferably includes a laser diode. The combiner 15 is input with the excitation light having been output from this excitation light source 12, and outputs this excitation light to the end face 11b of the optical amplification fiber 11. Furthermore, the combiner 15 transmits the light having been output from the lens 18 and outputs it to the end face 11b of the optical amplification fiber 11. In addition, the combiner 15 transmits the light having been emitted from the fluorescent element of the optical amplification fiber 11 (light having been outputted from the end face 11b), and outputs it to the lens 18.

The optical switch 13 includes a first port 13a, a second port 13b and a third port 13c. The first port 13a is optically connected to the total reflection mirror 17, and the third port 13c is optically connected to the end face 11b of the optical amplification fiber via the lens 18. The second port 13b is a reflection-free termination with no object that is optically connected thereto. The drive circuit 14 drives the optical switch 13. As a result of such drive control by the drive circuit 14, at the optical switch 13, either a first optical path between the first port 13a and the third port 13c or a second optical path between the second port 13b and the third port 13c is selectively brought in the state in which light can be transmitted.

This optical switch 13 may be a device of utilizing an acousto-optic effect, a device of utilizing an electro-optic effect or a device of utilizing a piezo-optic effect (for example, a device manufactured by CVI). In the case in which the optical switch 13 is the device of utilizing the acousto-optic effect, for the duration of time that the optical switch 13 is applied with no high-frequency voltage, light having been outputted from the end face 11b of the optical amplification fiber 11 is not diffracted, but output to the reflection-free termination from the second port 13b. On the other hand, for the duration of time that the optical switch 13 is applied with the high-frequency voltage, the light having been outputted from the end face 11b of the optical amplification fiber 11 is diffracted to be output to the total reflection mirror 17 from the first port 13a.

Incidentally, the optical switch 13 may be constructed so as to function in inverse relation to the above-described operation. That is, for the duration of time that the optical switch 13 is applied with no high-frequency voltage, the light having been outputted from the end face 11b of the optical amplification fiber 11 may not be diffracted, but may be output to the total reflection mirror 17 from the first port 13a. On the other hand, for the duration of time that the optical switch 13 is applied with the high-frequency voltage, the light having been outputted from the end face 11b of the optical amplification fiber 11 may be diffracted to be output to the reflection-free termination from the second port 13b. This operation switching of the optical switch 13 is made by the drive circuit 14. The drive circuit 14 employs, for example, a function generator.

The lens 18 guides the light having been outputted from the end face 11b of the optical amplification fiber 11 to the third port 13c of the optical switch 13. In addition, the lens 18 guides the light having been outputted from the third port 13c of the optical switch 13 to the combiner 15. The total reflection mirror 17 totally reflects the light having been outputted from the first port 13a of the optical switch 13 and guides this reflected light to the first port 13a of the optical switch 13.

The collimator 16 outputs the light having been outputted from the end face 11a of the optical amplification fiber 11 toward the light irradiation section 21.

The light irradiation section 21 is input with the light having been outputted from the collimator 16, and outputs it toward to an object 30 that is placed in a base-plane S that is virtually set. Incidentally, the object 30 to be placed in the base-plane S may be a single item, or may be formed of a plurality of objects $30_1, \ldots, 30_n, \ldots, 30_N$. Furthermore, the light irradiation section 21 can scan the irradiation position with the light to be output from the light irradiation section 21 at the object 30 and the surroundings thereof. In specific, the light irradiation section 21 is formed of a scanning means such as a galvano-scanner, and moves the irradiation position with light in parallel with respect to the base-plane S in which the object 30 is placed. The scanning speed of the irradiation position using the light irradiation section 21 is less than 1 m/s.

The optical attenuation filter 23 has an optical density of not less than 7 (transmittance is $1/10^7$), and transmits only the light of the rate of the above-mentioned transmittance of the light having been transmitted without irradiating the object 30 out of the light having been outputted from the light irradiation section 21.

The photo-detector section 22 includes a plurality of photo diodes (PD) disposed along the scanning direction of a laser beam, and detects the light having been transmitted through the optical attenuation filter 23 (the light having reached the optical attenuation filter 23 and thereafter having been attenuated by the optical attenuation filter 23). Furthermore, the photo-detector section 22, in the case of detecting a laser beam to be output from the light irradiation section 21, notifies the control section 10 of this detection with electrical signals.

The control section 10 receives a detection signal having been reported from the photo-detector section 22, and instructs switching of the optical switch 13 by means of the drive circuit 14.

In addition, as the object 30, there are placed N numbers of objects $30_1, \ldots, 30_n, \ldots, 30_N$ in the base-plane S. N is an integer of not less than 1, and n that will come on hereinafter is an integer of not less than 1 as well as not more than N. As the object 30n employs, for example, a coaxial cable is used. In specific, it is in the state in which a plurality of AWG32 coaxial cables is placed in parallel, and the cross sections thereof is shown in FIG. 1.

The specific construction example of the laser processing apparatus 1 according to the first embodiment is as follows. The optical amplification fiber 11 is an optical fiber to which optical waveguide region Yb element is added. The excitation light source 12 outputs an excitation light in the wavelength band of 915 nm that can excite the Yb element. At this time, the optical amplification fiber 11 emits the luminescence in the wavelength band of 1.06 μm. The optical amplification fiber 11 has the length of 10 m, the core diameter of 10 μm and the inside clad diameter of 125 μm. Further, as optical characteristics of the optical amplification fiber 11, the unsaturated absorption in the wavelength band of 915 nm is 10.76 dB/m. The power of excitation in the wavelength band of 915 nm to be supplied from the excitation light source 12 to the optical amplification fiber 11 is 6.3 W. The optical switch 13 is the device of utilizing an acousto-optic effect (AO switch), and the drive circuit 14 applies RF voltage to the optical switch 13. The repetition frequency of switching of the optical switch 13 is variable.

In the laser processing apparatus 1 having the above-described structure, the excitation light having been continuously outputted from the excitation light source 12 is once condensed by the combiner 15. Subsequently, the excitation light from the combiner 15 is input from the end face 11b of the optical amplification fiber 11, being a laser medium, and excites a luminescent element that is added to the optical amplification fiber 11. Furthermore, when the first optical path between the first port 13a and the third port 13c of the optical switch 13 is in the state in which light can be transmitted, the optical system between the end face 11a of the optical amplification fiber 11 and the total reflection mirror 17 forms a laser resonator of Fabry-Perot type. On the resonator optical path of this laser resonator, the optical amplification fiber 11 acting as a laser medium is located. Further, when the second optical path between the second port 13b and the third port 13c of the optical switch 13 is in the state in which light can be transmitted, attenuation loss of the above-mentioned laser attenuator is the maximum, and the light having been outputted from the optical amplification fiber 11 acting as a laser medium reaches the reflection-free termination. In such way, since the optical switch 13 and the drive circuit 14 in this first embodiment act as a Q switch means, a pulse laser beam can be output from the laser resonator. The above-described construction corresponds to a laser light source. Incidentally, instead of the above-described construction, it is preferable to be of MOPA (Master Oscillator Power Amplifier) construction of letting a semiconductor laser or a solid laser of making a pulse modulation a seed light source, and thereafter making optical fiber amplification.

In addition, the light irradiation section 21 corresponds to an irradiation optical system of applying a laser beam having been emitted from the laser light source to the object $30_n$ that is placed on the base-plane S and the surroundings thereof in a direction perpendicular to this base-plane S while scanning the irradiation position with this laser beam. The photo-detector section 22 corresponds to a light detector of detecting the laser beam having been applied by the irradiation optical system. Further, the control section 10 makes the following control. The control section 10 continuously oscillates the laser beam with respect to the laser light source for the duration of time that the laser beam having been applied by the light irradiation section 21 is detected at the photo-detector section 22; while it pulse-oscillates the laser beam with respect to the laser light source for the duration of time that no laser beam having been applied by the light irradiation section 21 is detected at the photo-detector section 22.

Here, a difference in the optical path of a laser beam between situations in which the laser beam to be output from the light irradiation section 21 does not reach (passes) the object $30_n$ to be processed and situations in which the laser beam reaches it will be described referring to FIGS. 2 and 3.

Figure 2:
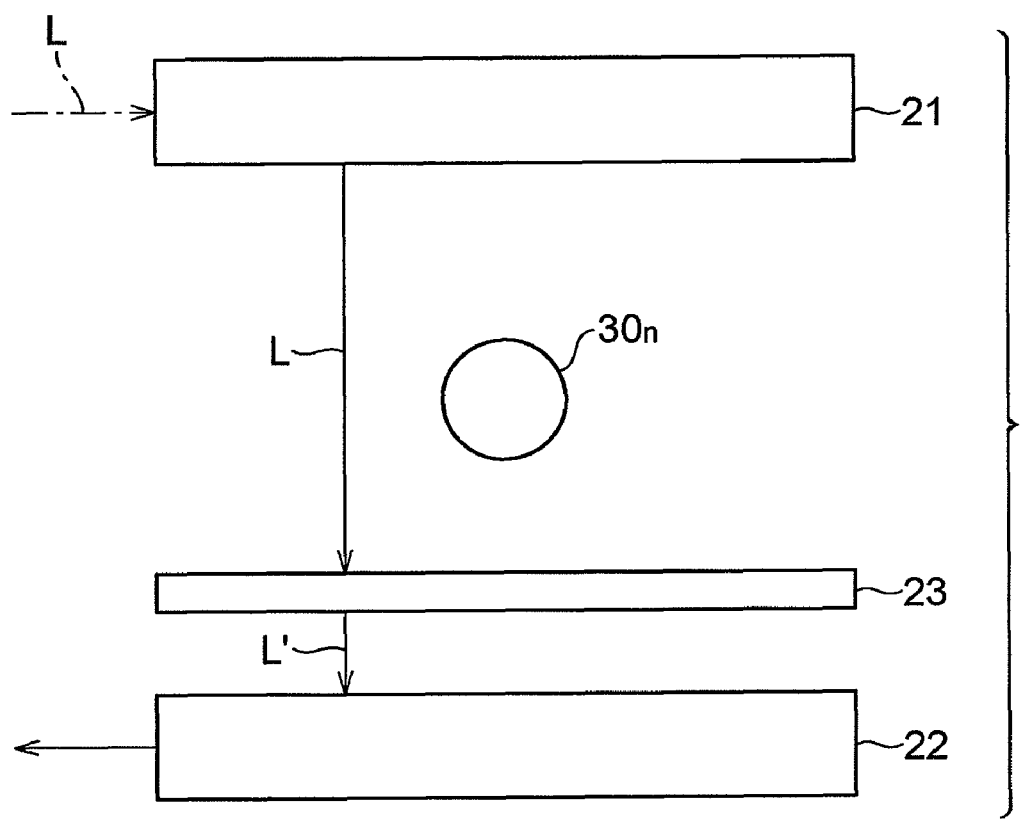
FIG. 2 is a view for explaining situations in which a laser beam to be emitted from a light irradiation section (irradiation optical system) has not reached (passed) an object in the laser processing apparatus according to the first embodiment.
Figure 3:
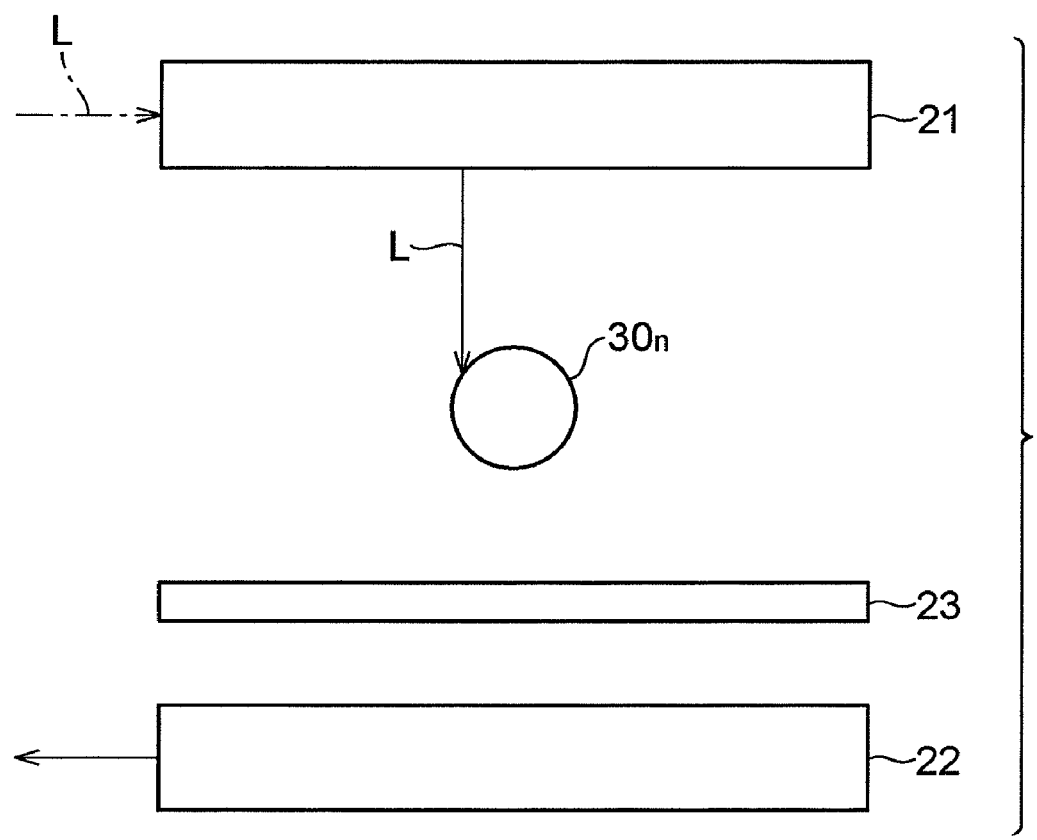
FIG. 3 is a view for explaining situations in which a laser beam to be emitted from a light irradiation section (irradiation optical system) has reached an object in the laser processing apparatus according to the first embodiment.

FIG. 2, in the first embodiment, is a view for explaining situations in which the laser beam L to be output from the light irradiation section 21 does not reach (passes) the object $30_n$. In FIG. 2, the laser beam L having been outputted from the laser light source is input to the light irradiation section 21, and thereafter output from the light irradiation section 21. In the case in which the laser beam L does not reach the object $30_n$, and passes the base-plane S in which this object $30_n$ is placed, this laser beam L reaches the optical attenuation filter 23. The optical attenuation filter 23 decreases the intensity of the laser beam L having reached, and outputs a laser beam L' having been attenuated. The laser beam L' having been outputted from the optical attenuation filter 23 reaches the photo-detector section 22. For the duration of time that the laser beam L' is detected at the photo-detector section 22, the drive circuit 14 operates the optical switch 13 and fixes it so that the first optical path between the first port 13a and the third port 13c is in the state in which light can pass. At this time, the laser beam L is output from the light irradiation section 21 as a continuous light.

Next, the case in which the object $30_n$ is irradiated with the laser beam L will be considered. FIG. 3, in the first embodiment, is a view for explaining situations in which the laser beam L to be output from the light irradiation section 21 reaches the object $30_n$. The laser beam L having been output from the laser light source is input to the light irradiation section 21 and thereafter output from the light irradiation section 21. At this time, in the case in which the laser beam L has reached the object $30_n$, the photo-detector section 22 notifies the control section 10 of interruption of the detection of the laser beam L (the laser beam L' having been attenuated) using electrical signals. At this time, the control section 10, with respect to the drive circuit 14, gives an instruction of pulse oscillation of the laser beam L in a trigger mode. The drive circuit 14 operates the optical switch 13 so as to be able to make pulse oscillation after having received this instruction, whereby the laser beam L is output from the light irradiation section 21 as a pulse light. As a result, at the surface of the object $30_n$ to be irradiated with the laser beam L, processing using the laser beam L is made.

In such way, the control section 10 makes the following switching operation. For the duration of time that the photo-detector section 22 detects the laser beam L (laser beam L' having been attenuated by the optical attenuation filter 23), the control section 10 continuously oscillates the laser beam L; while for the duration of time that no laser beam L is detected, it pulse-oscillates the laser beam L. This switching between the pulse oscillation and the continuous oscillation can be actualized by a commercially available function generator (trade name: WW2571, manufactured by TOYO Corp.). That is, in the case in which such a function generator is operated in a trigger mode, pulse oscillation of the laser beam L can be made within 100 ns from the notification of the interruption of laser beam L detection at the photo-detector section 22. In the case in which the scanning speed of the irradiation position with the laser beam using the light irradiation section 21 is 1 m/s, within 0.1 μm from a time point at which the photo-detector section 22 perceives that the detection of the laser beam L' having been attenuated is interrupted, the pulse oscillation of the laser beam L can be started.

On the occasion when application of the laser beam L is switched from the continuous oscillation to the pulse oscillation, since all the energy having been charged at the optical amplification fiber 11 is output as a laser beam shortly after the start of pulse oscillation, the laser beam is output from the light irradiation section in the state in which the intensity of this laser beam is higher than that at the time of normal pulse oscillation (overshoot).

Figure 4A:
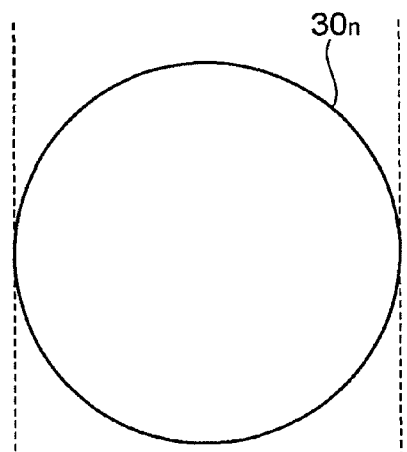
FIGS. 4A to 4C are charts for explaining an intensity change of the laser beam when making a pulse oscillation in the laser processing apparatus according to the first embodiment.
Figure 4B:
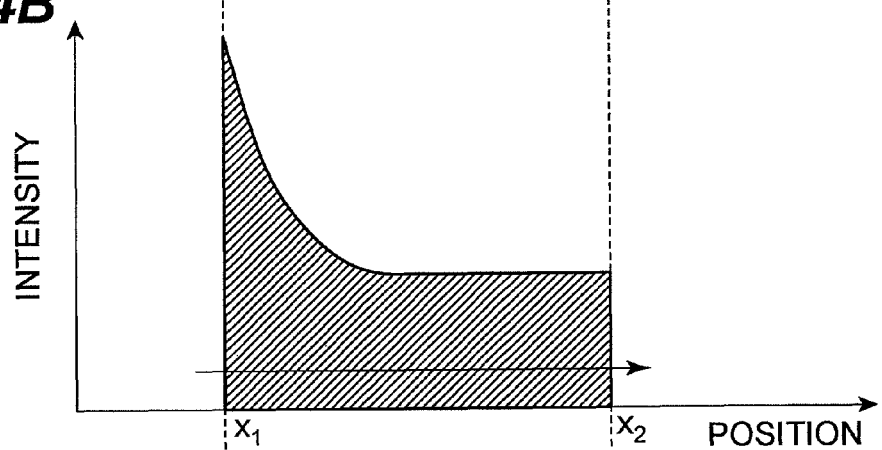
Figure 4C:
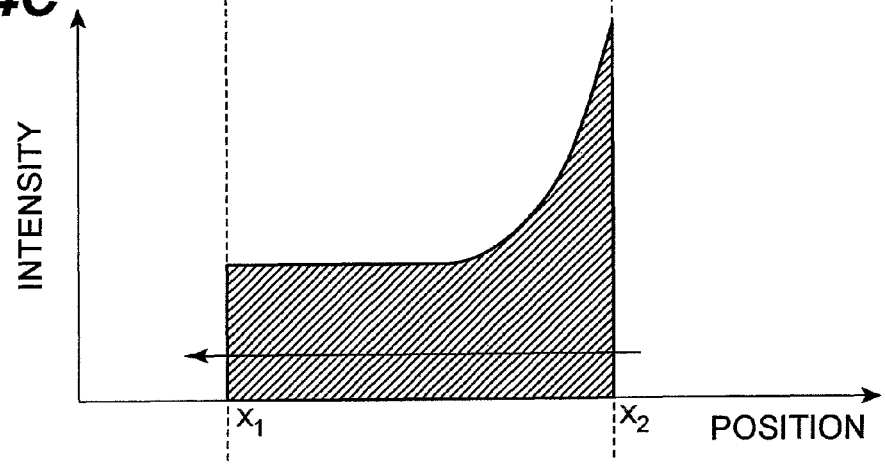

FIGS. 4A to 4C are charts for explaining the change in intensity of a laser beam at the time of pulse oscillation in the laser processing apparatus 1 according to the first embodiment. In particular, FIG. 4A shows the cross section of the object $30_n$, and FIGS. 4B and 4C show the change in intensity of this laser beam on the occasion when this object $30_n$ is irradiated with pulse-oscillated laser beam in directions opposite to each other.

That is, FIG. 4B shows the change in intensity of a laser beam in the case in which the irradiation position with the laser beam is scanned along the direction indicated by an arrow in the drawing (in a first direction: in the direction from $x_1$ to $x_2$) using the light irradiation section 21. First, when the irradiation position with the laser beam is on the left side of $x_1$ that is in the case in which the laser beam has not reached the object $30_n$, the laser beam is detected at the photo-detector section 22, so that continuous oscillation is made. Thereafter, at a time point when the irradiation position has reached the position of $x_1$, since the object $30_n$ is irradiated with the laser beam, the laser beam comes not to be detected at the photo-detector section 22, and pulse oscillation of the laser beam is started.

Here, the beam scanning speed of the light irradiation section 21 is to be 1 m/s. Furthermore, the distance between the object $30_n$ and the object $30_{n-1}$ adjacent thereto shown in this FIG. 4B is to be 60 μm. In the case in which the light irradiation section 22 irradiates the object $30_{n-1}$ and thereafter the laser beam is detected at the photo-detector section 22, continuous oscillation of the laser beam is started. Thereafter, until pulse oscillation of the laser beam toward the object $30_n$ is started (the irradiation position has reached $x_1$), the state of no pulse oscillation continues for 60 μs. When on such conditions, the irradiation position of the light irradiation section 21 has reached $x_1$ (shortly after pulse oscillation of the laser beam has started), a pulse light of the same intensity as that at the time of letting the repetition frequency of the optical switch 13 16.7 kHz. Therefore, the intensity of the laser beam to be applied to the object $30_n$ is in overshoot. Thereafter, the intensity of the laser beam comes to be constant (at the repetition frequency of 75 kHz), and when the irradiation position with this laser beam passes $x_2$ (the irradiation position with the laser beam comes to be on the right side of $x_2$), no laser beam is applied directly onto the object $30_n$. At this time, since the laser beam is detected by the photo-detector section 22 again, the oscillation method of the laser beam is changed to continuous oscillation. Owing to the above-described arrangement, the intensity of the laser beam becomes high on the occasion when the vicinity of the side face $x_1$ of the object $30_n$ is irradiated, and thus processing at the side face ($x_1$ side) of the object $30_n$, conventionally where the laser beam is difficult to reach and which is likely to be insufficiently processed, can efficiently be made.

Incidentally, effects of this overshoot becomes marked in the case in which the beam scanning speed is low and in the case in which setting of the repetition frequency at the time of pulse oscillation is high.

FIG. 4C shows the change in intensity of a laser beam in the case in which the irradiation position with the laser beam is scanned in the direction indicated by an arrow in the drawing (in a second direction: in the direction from $x_2$ to $x_1$) using the light irradiation section 21. In this case, at a time point when the irradiation position has reached $x_2$ from outside the object $30_n$, pulse oscillation of the laser beam is started. Therefore, the intensity of the laser beam comes to be in the overshoot state at a time point when the irradiation position is at $x_2$, and the laser beam of high intensity is applied to the object $30_n$. Thus, as shown in FIG. 4C, when the vicinity of the side face $x_2$ of the object $30_n$ is irradiated with the laser beam, the intensity of this laser beam comes to be high, thus enabling the side face ($x_2$ side) of the object $30_n$ to be processed As shown in FIGS. 4B and 4C, using the light irradiation section 21, a laser scanning is made while the irradiation position with the laser beam is being reciprocated with respect to the object $30_n$. Consequently, since the side faces $x_1$ and $x_2$ on both sides of the object $30_n$ are irradiated with the laser beam of high intensity, the side faces on both sides of the object $30_n$ that are originally difficult to be processed can be efficiently processed.

Figure 5A:
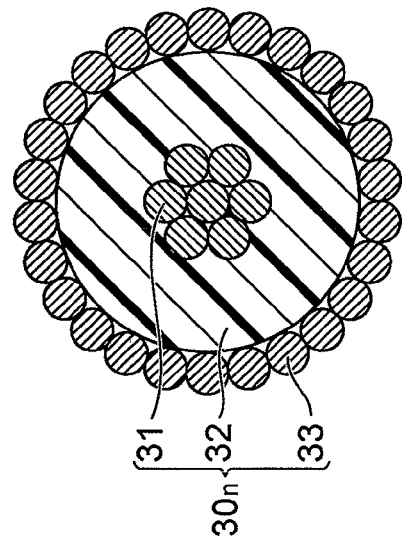
FIGS. 5A to 5C are views for explaining a shape change of an object $30_n$ when making a laser processing using the laser processing apparatus according to the first embodiment as compared with a conventional technique.
Figure 5B:
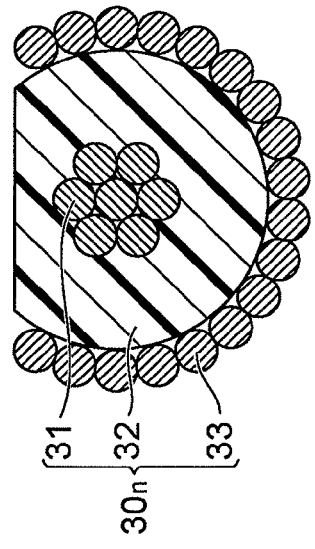
Figure 5C:
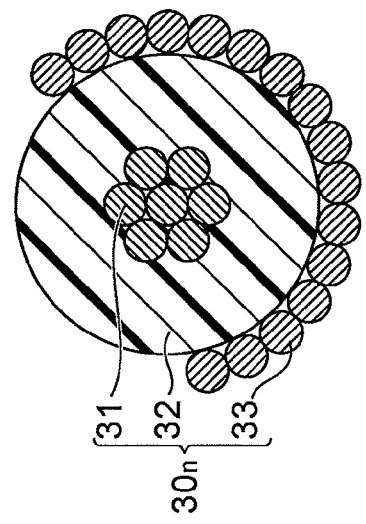

The change in shape of the object $30_n$ when a laser processing is made with the use of the above-described laser processing apparatus 1 is shown in FIGS. 5A to 5C in comparison with conventional techniques. FIG. 5A shows the sectional structure of the object $30_n$ before processing. FIG. 5B shows the sectional structure of the object $30_n$ after having been processed by the conventional laser processing method. FIG. 5C shows the sectional structure of the object $30_n$ after the irradiation position with the laser beam has been scanned from on the upper left side to on the upper right side of the object $30_n$ by the laser processing method according to this first embodiment.

As shown in FIG. 5A, the object $30_n$ is a coaxial cable, which is formed of a central conductor 31, an internal insulator 32 and a shield wire 33 that are disposed in the order from the center. Here, in the case of processing of removing the shield wires 33 of the object $30_n$, the below-described problem is raised in the conventional laser processing method. That is, when the laser beam is applied from above, and the shield wires 33 that are positioned on the side face of the object $30_n$ are intended to remove, as shown in FIG. 5B, the internal insulator 32 is removed up to at the same depth as well.

However, according to this first embodiment, since the side face of the object $30_n$ is irradiated with the laser beam having high intensity, as shown in FIG. 5C, without removal of the internal insulator 32, only the shield wires 33 that are positioned at the upper portion and on the side face (on the left side) of the object $30_n$ can be removed. Incidentally, since FIG. 5C shows the case in which the irradiation position with the laser beam is scanned from on the left side to on the right side of the object $30_n$, only the shield wires 33 on the left side face are removed. However, by scanning the irradiation position with the laser beam from on the right side to on the left side, the shield wires 33 on the right side face of the object $30_n$ can be removed as well.

As described above, according to the laser processing apparatus and the laser processing method according to the first embodiment, processing e.g., in the place where the laser beam is difficult to reach (on the side face of the object $30_n$ in FIG. 5A) can be properly made, as well as a laser processing can be made without damage of the object $30_n$ itself also in the place where the laser beam is easy to reach (at the upper portion of the object $30_n$ to be processed in FIG. 5A).

A Second Embodiment

Figure 6:
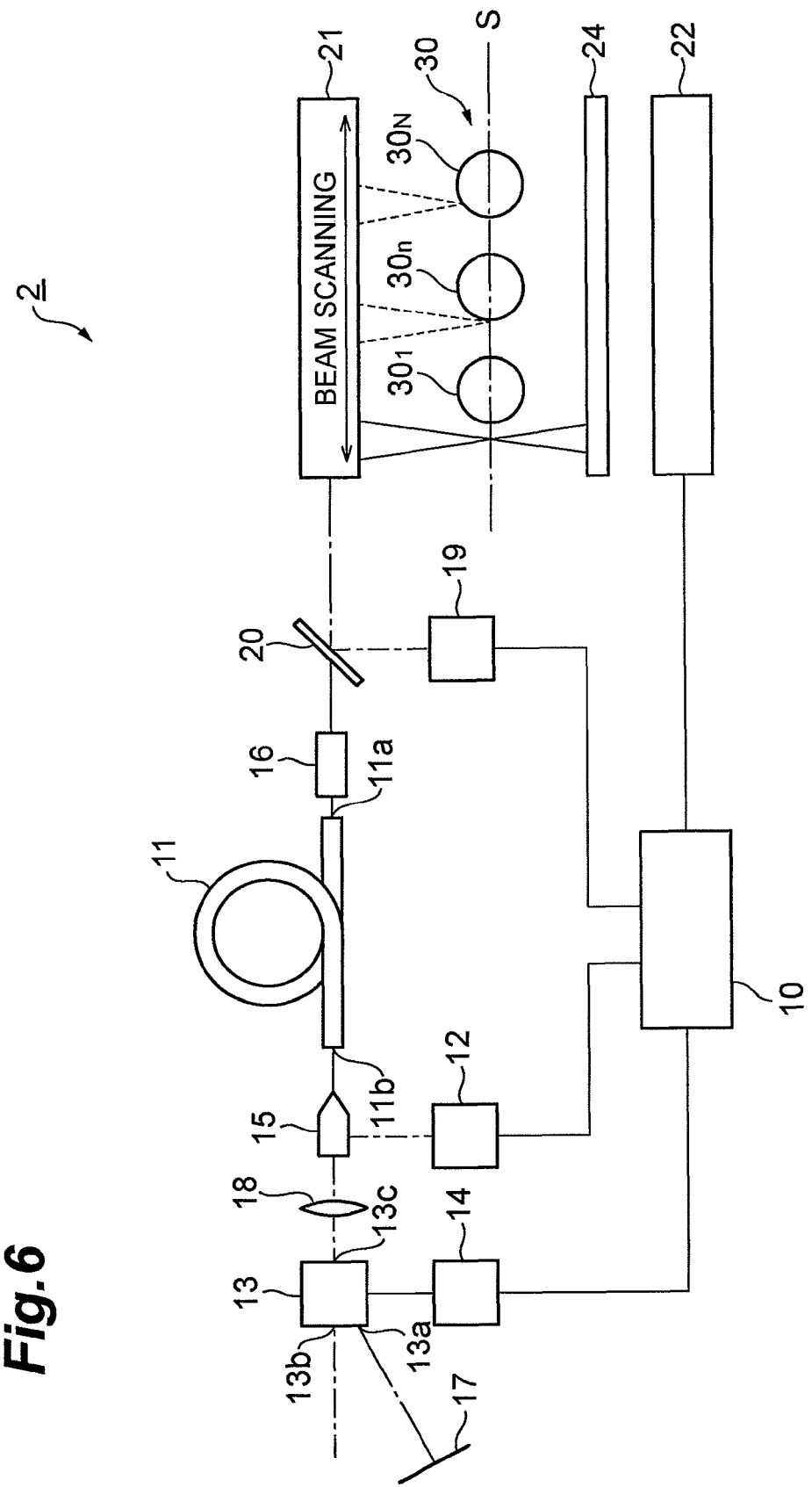
FIG. 6 is a view showing a second embodiment of a laser processing apparatus according to the present invention.

A second exemplary embodiment of a laser processing apparatus according to the present invention will be described. FIG. 6 is a view showing construction of the laser processing apparatus according to the second embodiment. The laser processing apparatus 2 according to the second embodiment shown in this FIG. 6, is provided with a control section 10, an optical amplification fiber 11, an excitation light source 12, an optical switch 13, a drive circuit 14, a combiner 15, a collimator 16, a total reflection mirror 17, a lens 18, a monitor light source 19, a dichroic mirror 20, a light irradiation section 21, a photo-detector section 22 and a spectral filter 24. The laser processing apparatus 2 according to this second embodiment is different from the laser processing apparatus 1 according to the first embodiment in the point of further provision of the monitor light source 19 and the dichroic mirror 20. Further, the laser processing apparatus 2 according to the second embodiment is different from the laser processing apparatus according to the first embodiment also in the point of provision of the spectral filter 24 instead of the optical attenuation filter 23.

The monitor light source 19 outputs a monitor light which wavelength is different that of the laser beam to be output from the laser light source including the excitation light source 12 toward the dichroic mirror 20. The wavelength of the monitor light is preferably 0.7 μm to 0.8 μm, or is in a visible light band of not more thane these values. Thus, the monitor light can be definitely distinguished from the laser beam of the wavelength of 1.06 μm.

The dichroic mirror 20 reflects the monitor light having been outputted from the monitor light source 19 toward the light irradiation section 21. In addition, the dichroic mirror 20 is input with the laser beam to be output from the collimator 16, and outputs this laser beam toward the light irradiation section 21. The laser beam and the monitor light are output into the same optical path from the dichroic mirror 20, and output perpendicularly with respect to the base-plane S in which the object $30_n$ is placed along the same optical path via the light irradiation section 21.

The spectral filter 24 transmits selectively only the monitor light of the laser beam and the monitor light to be output in the same optical path from the light irradiation section 21. As the spectral filter 24, for example, a dichroic mirror having a wavelength separation function is applicable. To properly make a wavelength separation, a plurality of dichroic mirrors may be provided.

In this second embodiment, the photo-detector section 22 includes a plurality of photo diodes, and detects only the monitor light having selectively been transmitted through the spectral filter 24 out of the laser beam and the monitor light to be output from the light irradiation section 21. Thus, the photo-detector section 22 preferably employs Si photodiode array having a higher conversion efficiency in the wavelength band of 0.7 to 0.8 μm, being the wavelength of the monitor light than in the wavelength band of 1.06 μm of the laser beam.

The control section 10, for the duration of time that the monitor light is detected by the photo-detector section 22, controls the excitation light source 12 and the drive circuit 14, and stops pulse oscillation of the laser beam. In addition, for the duration of time that no monitor light is detected by the photo-detector section 22, the control section 10 starts pulse oscillation of the laser beam.

In the laser processing apparatus 2 according to the second embodiment having the above-described structure, the difference in the optical path of the laser beam between the state in which the laser beam and the monitor light to be emitted from the light irradiation section 21 have not reached (passed) the object $30_n$ and the state in which they have reached, will be described referring to FIGS. 7 and 8.

Figure 7:
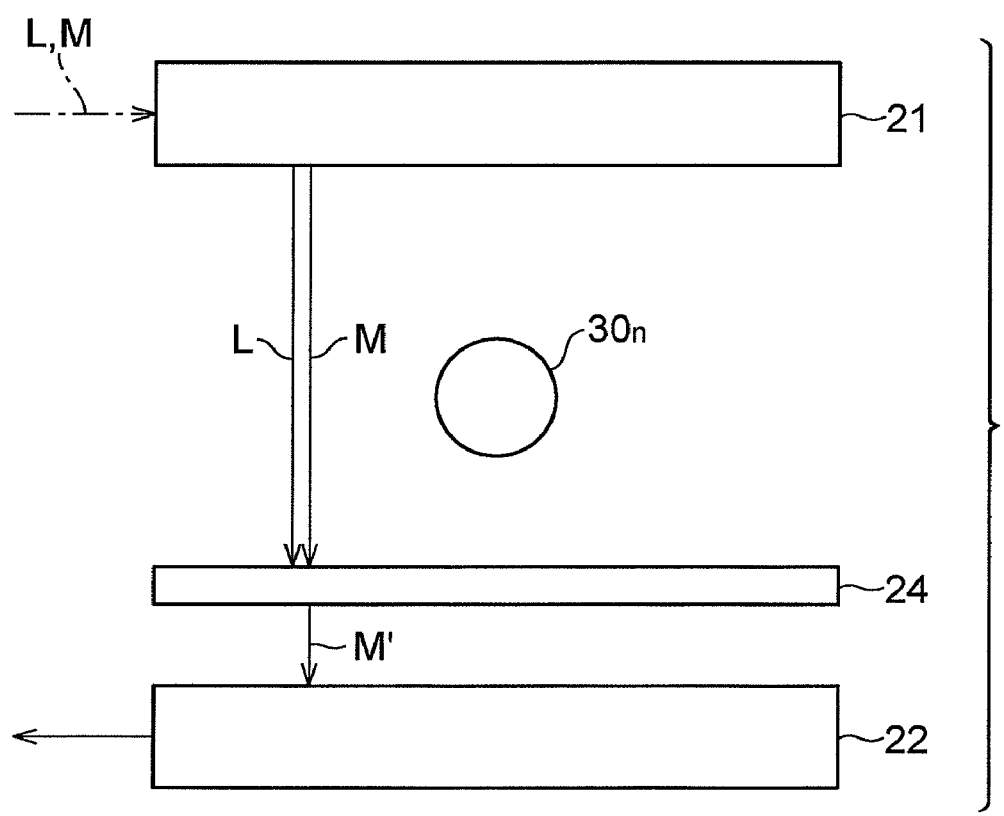
FIG. 7 is a view for explaining situations in which a laser beam and a monitor light to be emitted from a light irradiation section (irradiation optical system) have not reached (passed) an object in the laser processing apparatus according to the second embodiment.
Figure 8:
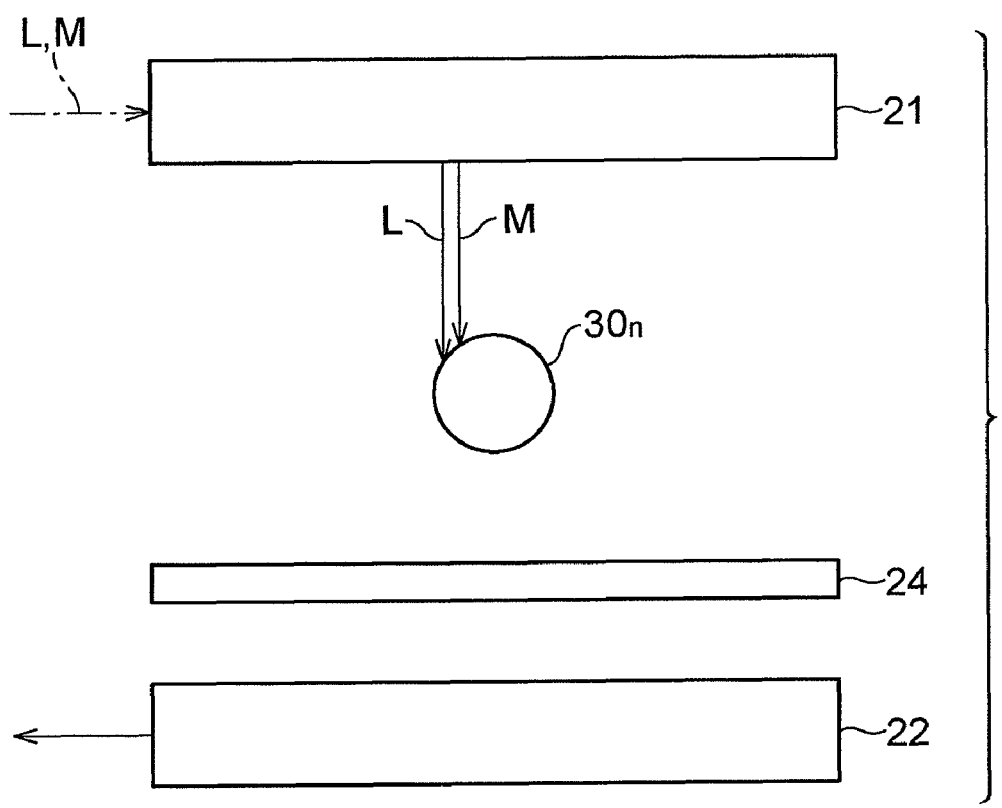
FIG. 8 is a view for explaining situations in which a laser beam and a monitor light to be emitted from a light irradiation section (irradiation optical system) have reached an object in the laser processing apparatus according to the second embodiment.

FIG. 7, in the second embodiment, is a view for explaining the state in which the laser beam L and the monitor light M to be emitted from the light irradiation section 21 have not reached (passed) the object $30_n$. In FIG. 7, the laser beam having been emitted from the laser light source and the monitor light M having been emitted from the monitor light source are input to the light irradiation section 21, and thereafter output on the same optical path from the light irradiation section 21 (in FIG. 7, for reasons of convenience, the optical paths of the laser beam L and the monitor light M are illustrated in the displaced state). At this time, in the case in which the laser beam L and the monitor light M have not reached the object $30_n$, and passed through the base-plane S in which the object $30_n$ is placed, both the laser beam L and the monitor light M have reached the spectral filter 24. The spectral filter 24 selectively transmits only the monitor light M of the laser beam L and the monitor light M that have reached. The monitor light M having been output from the spectral filter 24 reaches the photo-detector section 22. For the duration of time that the photo-detector section 22 detects the monitor light M, the drive circuit 14 operates the switch 13, and fixes it so that the first optical path between the first port 13a and the third port 13c is in the state in which light can pass. Therefore, the laser beam L is output from the light irradiation section 21 as a continuous light.

On the other hand, the state in which the laser beam L is directly applied to the object $30_n$ will be considered. FIG. 8, in the second embodiment, is a view for explaining the state in which the laser beam L and the monitor light M to be emitted from the light irradiation section 21 have reached the object $30_n$. The laser beam L having been emitted from the laser light source and the monitor light M having been emitted from the monitor light source are input to the light irradiation section 21, and thereafter output toward the base-plane S from the light irradiation section 21. At this time, in the state in which the laser beam L and the monitor light M have reached the object $30_n$, the photo-detector section 22 notifies the control section 10 of interruption of the detection of the monitor light M using electrical signals. At this time, control section 10, with respect to the drive circuit 14, makes an instruction of pulse oscillation of the laser beam L in a trigger mode. The drive circuit 14, after having received this instruction, operates the switch 13 and starts pulse oscillation of the laser beam, and this laser beam L is output from the light irradiation section 21 as a pulse light. As a result, at the surface of the object $30_n$ to be irradiated with the laser beam L, processing using the laser beam L is made.

In such way, the control section 10 makes the following switching operation. The control section 10 makes a continuous oscillation of the laser beam L in the case in which the monitor light M (monitor light M' having been attenuated by the optical attenuation filter 23) is detected by the photo-detector section 22; and it makes a pulse oscillation of the laser beam L for the duration of time that no laser beam L is detected.

Also in this second embodiment, as is the first embodiment, overshoot occurs shortly after pulse oscillation has started on the occasion of making the pulse oscillation of the laser beam. As a result, the side face of the object $30_n$, where the laser beam reaches is irradiated with the laser beam of high pulse strength shortly after the pulse oscillation has started. Therefore, the side face of the object $30_n$ can be efficiently processed.

Modifications of Embodiment

In addition to the above-mentioned first and second embodiments, as the method of efficiently processing the side face of the object $30_n$, there is the method of changing a pulse pattern while this object $30_n$ is being pulse-irradiated with a laser beam. Hereinafter, an example of changing the pulse pattern will be described. These modifications are useful in the case of no occurrence of overshoot on the occasion when the pulse oscillation of a laser beam is started. In specific, for example, it is MOPA arrangement, and given is e.g., the case of adopting the method in which a seed light source output is made the same as a peak value at the time of pulse oscillation even at the time when the pulse oscillation is stopped to be in the state of CW (continuous wave).

Figure 9A:
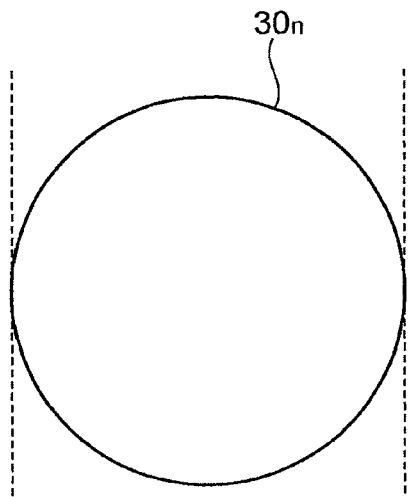
FIGS. 9A to 9C are charts for explaining examples of changing a pulse pattern of the laser beam.
Figure 9B:
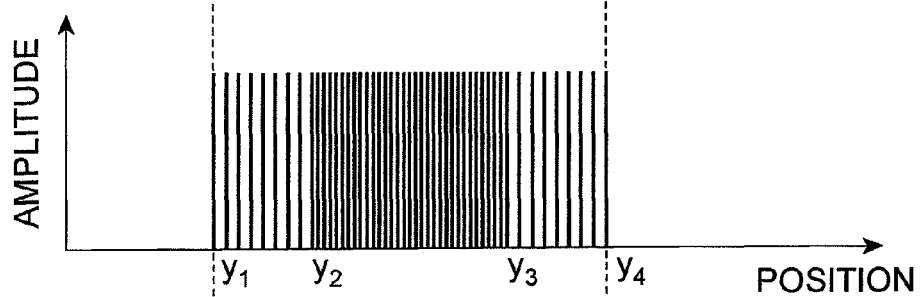
Figure 9C:
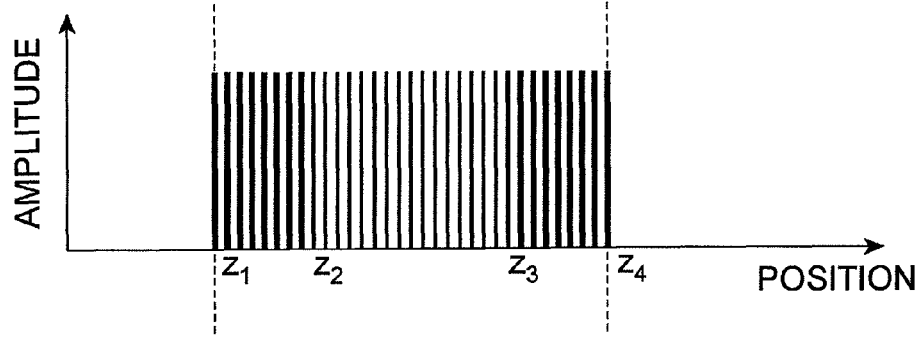

FIGS. 9A to 9C are charts for explaining examples of changing the pulse pattern of the laser beam. In particular, FIG. 9A shows the sectional view of the object $30_n$. FIG. 9B shows an example in which the repetition frequency of pulse patterns is changed. Furthermore, FIG. 9C shows an example in which the pulse width of pulse patterns is changed.

As shown in FIG. 9B, in the example in which the repetition frequency is changed, within the section $y_1$-$y_4$ in which the laser beam is applied, the repetition frequency in the sections $y_1$-$y_2$ and $y_3$-$y_4$ is different from that in the section $y_2$-$y_3$, and the repetition frequency in the section $y_2$-$y_3$ is higher than the repetition frequency in the other sections. When the repetition frequency is high, output energy per one pulse of the laser beam is decreased. Therefore, in the case in which the modification example of the repetition frequency as shown in this FIG. 9B is adopted, in the sections $y_1$-$y_2$ and $y_3$-$y_4$, the object $30_n$ can be laser-processed at a higher efficiency, as compared with the section $y_2$-$y_3$. The repetition frequency can be changed to be, for example, 75 kHz in the sections $y_1$-$y_2$ and $y_3$-$y_4$, and 90 kHz in the section $y_2$-$y_3$. This change of the repetition frequency is made by the control section 10. However, in case where the repetition frequency is extremely changed, in some cases, the processing efficiency using the laser beam is varied considerably.

As shown in FIG. 9C, in the example in which the pulse width is changed, the MOPA arrangement is adopted, and this MOPA arrangement is useful in the case in which the pulse peak is in the saturated state. Within the section $z_1$-$z_4$ in which the object $30_n$ is irradiated with the laser beam, by changing the pulse width in sections $z_1$-$z_2$ and $z_3$-$z_4$ and that in the section $z_2$-$z_3$, a processing efficiency can be changed. In particular, as shown in FIG. 9C, by making large the pulse width in the sections $z_1$-$z_2$ and $z_3$-$z_4$ than the pulse width in the section $z_2$-$z_3$, it is possible to increase the energy per one pulse. Whereby, the processing efficiency using the laser beam can be made high, and thus the side face of the object $30_n$ can be laser-processed at high efficiency. The pulse width can be changed to be, for example, 20 ns in the sections $z_1$-$z_2$ and $z_3$-$z_4$, and 15 ns in the section $z_2$-$z_3$. This change of the pulse width is made by the control section 10.

Although heretofore, the embodiments according to the present invention have been described, the present invention is not limited to the above-described embodiments, and a variety of modifications can be made. For example, although in the above-described embodiments, the fiber laser to which Yb is added is used, a solid laser of e.g., Nd:YAG may be employed.

In accordance with the present invention, it is possible to obtain the laser processing apparatus and the laser processing method in which processing in the place where a laser beam is difficult to reach is properly made, as well as laser processing also in the place where the laser beam is easy to reach can be made without the occurrence of damage.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser processing apparatus, comprising:
   a laser light source emitting a laser beam;
   an irradiation optical system applying the laser beam emitted from the laser light source to an object and surroundings thereof while scanning an irradiation position of the laser beam along a predetermined direction;
   a photo-detector provided on the opposite side to the irradiation optical system with respect to the object, the photo-detector detecting the laser beam applied from the irradiation optical system; and
   a control section making switching between a continuous oscillation and a pulse oscillation of the laser beam at the laser light source,
   wherein the control section makes a continuous oscillation of the laser beam with respect to the laser light source in the case in which the laser beam applied from the irradiation optical system is detected at the photo-detector; and makes a pulse oscillation of the laser beam with respect to the laser light source in the case in which no laser beam applied from the irradiation optical system is detected at the photo-detector.

2. A laser processing apparatus according to claim 1, wherein the irradiation position of the laser beam is scanned at a speed of less than 1 m/s.

3. A laser processing apparatus according to claim 1, wherein the irradiation optical system includes such a scanning path that the irradiation position of the laser beam gets across the object from outside the object, and thereafter reaches outside the object, and wherein the control section controls a start and a stop of a pulse oscillation of the laser beam when the irradiation optical system reciprocates along the scanning path.

4. A laser processing apparatus according to claim 1, wherein the control section has a function changing a repetition frequency at the time when the laser light source pulse-oscillates the laser beam, and makes the repetition frequency higher than that at the start of pulse oscillation at least once while the laser light source emits the laser beam.

5. A laser processing apparatus according to claim 1, wherein the control section has a function of changing an energy per one pulse at the time when the laser light source pulse-oscillates the laser beam, and makes the energy smaller than that at the start of pulse oscillation at least once while the laser light source emits the laser beam.

6. A laser processing method, comprising the steps of:
   applying a laser beam emitted from a laser light source to an object and surroundings thereof while scanning an irradiation position of the laser beam along a predetermined direction via an irradiation optical system;
   detecting the laser beam applied from the irradiation optical system using a photo-detector provided on the opposite side to the irradiation optical system with respect to the object; and
   making a continuous oscillation of the laser beam with respect to the laser light source in the case in which the laser beam applied from the irradiation optical system is detected by the photo-detector, and in the meantime, making a pulse oscillation of the laser beam with respect to the laser light source in the case in which no laser beam applied from the irradiation optical system is detected by the photo-detector.

7. A laser processing method according to claim 6, wherein the irradiation position of the laser beam is scanned at a speed of less than 1 m/s.

8. A laser processing method according to claim 6, wherein the irradiation optical system reciprocates an irradiation position of the laser beam so as to get across the object along a first direction, and thereafter to get across the object again along a second direction opposite to the first direction.

9. A laser processing method according to claim 6, wherein a repetition frequency of pulse oscillation is set to be higher than that at the start of emission of the laser beam at least once while the laser light source emits the laser beam.

10. A laser processing method according to claim 6, wherein an energy per one pulse at the time of pulse oscillation is set to be smaller than that at the start of emission of the laser beam at least once while the laser light source emits the laser beam.

* * * * *